Sept. 1, 1959 W. J. BLACK 2,902,316
WHEEL COVER WITH LOCKING DEVICES
Filed Sept. 15, 1953 2 Sheets-Sheet 1

INVENTOR
WILLIAM J. BLACK
BY
his ATTORNEY

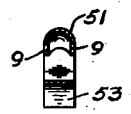
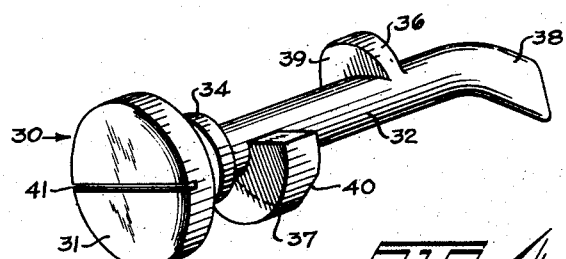
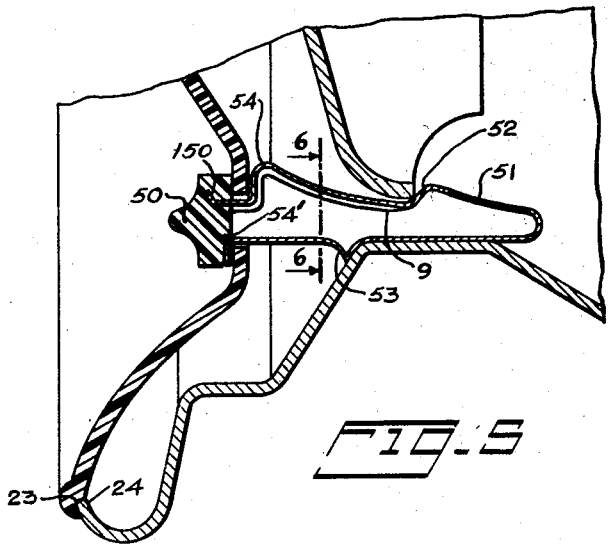
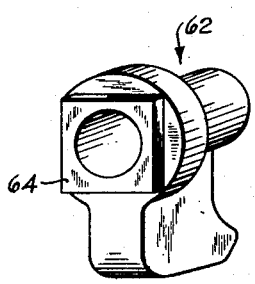
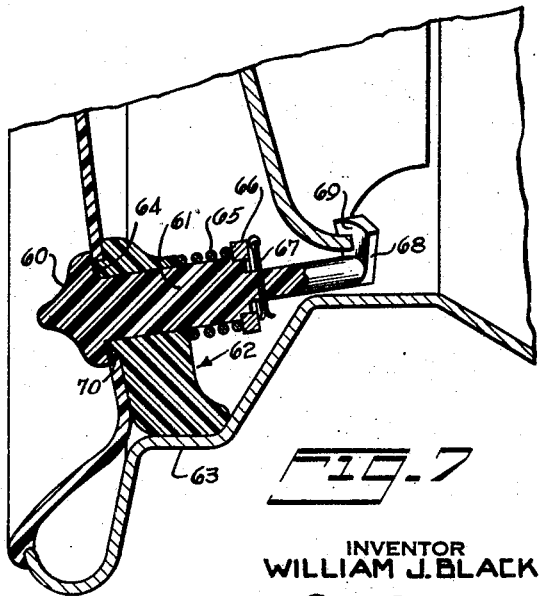
INVENTOR
WILLIAM J. BLACK

United States Patent Office 2,902,316
Patented Sept. 1, 1959

2,902,316

WHEEL COVER WITH LOCKING DEVICES

William J. Black, Chatham, N.J., assignor to Curtiss-Wright Corporation, a corporation of Delaware Application September 15, 1953, Serial No. 380,218

5 Claims. (Cl. 301—37)

My invention relates to wheel covers for automobiles and has as its prime object the provision of a novel and improved wheel cover provided with locking devices suitable for securing the cover to a wheel.

It is another object of my invention to provide such a wheel cover wherein the locking devices are assembled in the wheel cover in such fashion that they cannot accidentally become detached and lost.

It is still another object of my invention to provide a wheel cover of the described type which is both simple in construction and economical to manufacture.

The invention will be more fully set forth in the following description referring to the accompanying drawings, and the features of novelty which characterize the invention will be pointed out particularly in the claims annexed to and forming a part of the specification.

Figure 1:
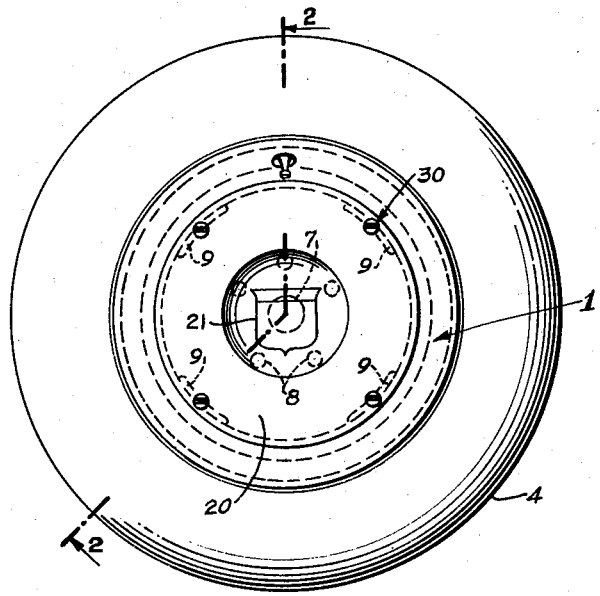
Figure 2:
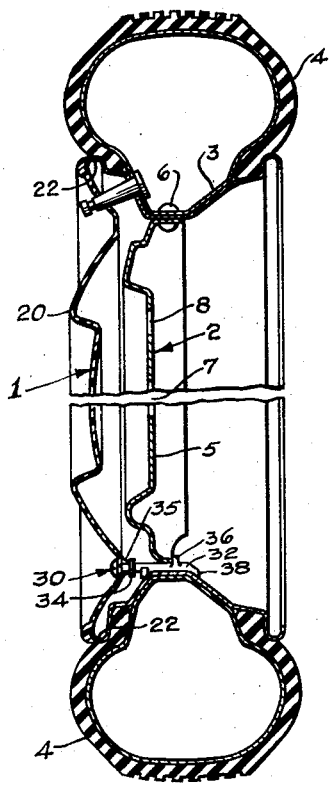
Figure 3:
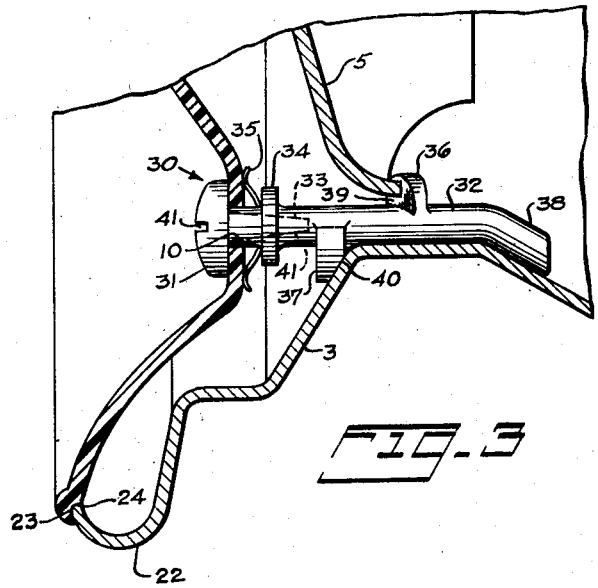

Referring to the drawings, Fig. 1 is a side elevational view of an automobile wheel fitted with a wheel cover of the type disclosed herein. Fig. 2 is a somewhat enlarged sectional view taken on the plane of the line 2—2 of Fig. 1. Fig. 3 is an enlarged fragmentary sectional view clearly showing the manner of securing the wheel cover to the wheel by means of the locking devices. Fig. 4 is an enlarged perspective view of the locking device shown in Fig. 3. Fig. 5 is an enlarged fragmentary view similar to Fig. 3 showing a modified form of locking device. Fig. 6 is a vertical sectional view taken on the plane of the line 6—6 of Fig. 5. Fig. 7 is an enlarged fragmentary sectional view similar to Fig. 3 showing another modified form of the locking device. Fig. 8 is an enlarged perspective view showing a locator member for the locking device of Fig. 7.

The wheel cover 1 which is also commonly known as a wheel disc or hub cap is shown in Fig. 1 of the drawings secured upon an automobile wheel 2. The wheel 2 includes a rim portion 3 for supporting a tire 4 and a body portion 5 which is connected to rim portion 1 in some suitable manner as by rivets 6. The body portion 5 has a central opening 7 to receive the end portion of an axle and has a plurality of openings 8 arranged circumferentially on the body portion to receive bolts for securing the wheel to the axle. A plurality of other openings 9 circumferentially disposed at equally spaced intervals exist between the wheel rim 3 and body portion 5, four such openings being shown.

The wheel cover 1 includes a disc portion 20 preferably formed of plastic or any other suitable inexpensive material which may be shaped into a desirable form such as that shown in Fig. 2 of the drawings. An attractive wheel cover may be obtained by forming the disc portion 20 of clear plastic and coating its interior surface with a colored lacquer. As shown a medallion 21 may be provided for the disc portion to enhance the appearance of the wheel cover and serve as an identifying symbol. The disc is preferably adapted to completely cover the wheel including rim portion 3 with sufficient space nevertheless maintained between the wheel cover and outer flange 22 of the rim to receive counter-balancing weights. Preferably the periphery of the disc portion is grooved as at 23 to receive the peripheral edge 24 of the wheel rim.

In accordance with my invention, I provide a plurality of plastic holding or locking devices 30 such as shown in Figs. 2, 3 and 4 of the drawings for securing the cover to the wheel. The locking devices 30 comprise a head portion 31, and a body portion 32 extending through openings 10 provided in disc portion 20 which openings are disposed for alignment with the openings 9 in the wheel itself. The head end portion 31 includes an integral conical projection 33 which is cemented to the body portion 32 by a suitable plastic cement, the cementing operation being performed during assembly of the locking devices in the wheel cover. In effecting the assembly of the devices 30 in the wheel cover the head end portions 31 of the locking devices are first predisposed over the openings 10 with the conical projections 33 extending therethrough, whereupon the body portions 32 are cemented to the head end portions, with the conical projections 33 fitted in end recesses 41 in the body portions. As shown, body portion 32 is provided with a flange 34 which provides a bearing surface for a spring washer 35 disposed between the flange 34 and the inner surface of wheel cover 1. The head end portions 31 of the locking devices 30 are in this way maintained in tight flush contact with the outer surface of the disc portion 20.

The locking devices 30 include a flanged portion 36 which is provided to engage body portion 5 of the wheel for securing the cover thereto, and another flanged portion 37 to engage the wheel rim for preventing unwanted motion of the hub cap when secured on the wheel including flexing or buckling of the disc portion inwardly. The inner end of the locking device is formed as at 38 to grip the rim so as to still more securely fasten the cover to the wheel. The engaging surfaces 39 and 40 of flange portions 36 and 37 are cammed so as to cause these surfaces to bear tightly against the wheel body portion and rim respectively when the locking devices are turned in a clockwise direction during the fitting of the cover to the wheel.

In assembling the cover on the wheel, the cover is positioned with the body portions of the locking devices extending through the openings 9, the locking devices having been first turned counter-clockwise substantially 90° from the position shown in Figs. 1 through 4 of the drawings to a position wherein the body portions of the locking devices can be inserted through openings 9 until flanges 36 and 37 contact the body portion and rim of the wheel respectively. The locking devices are then turned in a clockwise direction substantially 90° to the positions shown in the drawings causing engaging surfaces 39 and 40 to bear tightly against body portion 2, and causing the disc portion 20 to be drawn inwardly whereby the disc at the grooved periphery 23 is forced tightly against the peripheral edge 24 of the wheel rim. End portion 38 of the locking device moves into engagement with the wheel rim during the turning of the locking device. As shown, a slot 41' is provided in the head end portions 31 of the locking devices to facilitate its turning with a screw driver or coin.

Another form of locking device useful for securing the wheel cover to the wheel is shown in Figs. 5 and 6 in the drawings. This locking device includes a plastic head end portion 50, and a body portion 51 which is formed from a strip of resilient metal. The body portion is secured to the head end portion at one end 150 while the other end remains free. The body portion is crimped for that portion of its length indicated in Fig. 5 to provide rigidity where required. In this form of my invention the head end and body portions of the locking devices may be assembled apart from the wheel cover and the body portion of the locking devices there-after inserted through openings in the wheel cover. This is in contrast to the first form of my invention wherein the head end and body portions of the locking buttons are assembled when the locking buttons are assembled in the cover. Body portion 51 is formed with a shoulder 52 for engaging the body portion 5 of the wheel structure, and also includes a mound-like projection 53 to engage the rim of the wheel for preventing the cover from buckling. The body portion 51 also includes an elevated portion 54 which is provided to prevent the locking device from becoming detached from the wheel cover. The locking devices are assembled in the cover by squeezing the ends of the strip metal body portion together at the head end of the locking device thereby permitting the locking devices to be inserted in the openings of the cover, and they may be removed from the wheel cover in a similar manner that is by depressing the upper portion of the body to permit elevated portion 54 and shoulder 52 to be moved out through the openings in the wheel cover. The cover is secured to the wheel with the locking devices already assembled in the cover by depressing the upper portion of the body an amount such that the shoulder 52 can be moved into the opening 9.

In the secured position of the wheel cover, shoulder 52 and the projection portion 53 of the body portion 51 engage the wheel body and rim respectively to lock the cover in position on the wheel, normal spring pressure of the resilient body portion 51 toward the wheel center being effective to retain the shoulder 52 in a latched position against the wheel body portion. As shown the shoulder 52 is inclined relative to the horizontal so as to force the locking device inwardly and the head end portion in tight flush contact with the outer surface of the disc portion 20 of the cover. A recess 54' is provided in head end portion 50 to receive the free end of the body portion 51. The disc is of course forced inwardly by the pressure of the head end portions of the locking devices and the peripheral edge 24 of the rim is forced into tight fitting contact in the grooved edge 23 of the wheel cover. In order to remove the cover from the wheel the head end portions 50 of the locking devices are depressed until the latching shoulder 52 is free of the wheel body portion whereupon the cover may be withdrawn. In this connection it is to be noted that the body portion of the locking device is so formed that the shoulder 52 may be depressed to a point permitting removal of the cover without the elevated portion 54 having been sufficiently depressed to permit the locking device to be removed from the cover. The locking devices are accordingly normally retained assembled in the cover during removal of the cover from the wheel so that there is no chance of the locking devices being lost.

Still another form of locking device is shown in Figs. 7 and 8. In this form of my invention the locking devices include an integral plastic head end portion 60 and body portion 61. The body portion is insertable through the openings in disc portion 20 and through a plastic locator member 62 which is adapted to engage the flange 63 of the wheel rim. It is intended that in this form of my invention the openings in disc portion 20 be rectangular rather than circular and the locator member 62 is formed with a raised rectangular end surface 64 which in the assembled portion of the cover and locking device fits into these rectangular openings 70 from the interior side of the cover to fix the locator position. The body portion 61 extends through the openings in the disc and locator and the head end portion 60 is maintained in firm contact with the outer surface of the disc by any suitable spring such as helical spring 65 which is disposed between the locator and a washer 66 on body portion 61, the washer being maintained in position by means of a cotter pin 67 extending through the locking device. As shown body portion 61 includes a flanged end portion 68 having a cammed surface 69 for engaging the wheel body portion. The cover is secured to the wheel by turning the locking device into a position substantially 90° from the position shown in Fig. 7 thereby permitting the flanged end portion to be inserted into the opening between the wheel rim and body portion whereupon the locking device is again turned through substantially 90° such as to cause the cammed surface 69 to bear tightly against the wheel body and bring the locator into firm contact with the flange 63 of the rim. Preferably surface 69 is cammed so that this tight engagement is effected by turning the locking button in a clockwise direction. The cover is firmly fastened to the wheel in this manner and undesirable movement thereof is prevented. In order to remove the cover from the wheel it is merely necessary to turn the locking device until the flanged end portion 68 can be withdrawn through the opening between the rim and wheel body.

It will now be obvious that I have provided simple and inexpensive means for suitably attaching a plastic or similarly constructed cover upon an automobile wheel and that the locking devices which I have provided for this purpose will securely fasten the cover to the wheel and will be effective in preventing any undesirable relative motion of the cover with respect to the wheel. Furthermore, the locking devices are retained assembled in the cover after removal of the cover from the wheel and cannot be accidentally detached therefrom so that they are not apt to be lost when for example it becomes necessary to remove the cover in order to change a tire.

Obviously, the necessity for metal parts in the described wheel cover has been reduced to a minimum since even the locking devices by means of which the cover is fastened to a wheel are constructed at least for the most part if not entirely of plastic material thereby reducing manufacturing costs and resulting in a beneficial reduction in weight. A reduction in the weight of the wheel covers is of course advantageous insofar as it enables a lessening of the unsprung weight of a vehicle. Further beneficial results achieved due to a reduction in wheel cover weight include a reduction in the end thrust which the wheels of a vehicle may exert against the wheel bearings or axles when the vehicle is being turned or driven around a curve. This end thrust is due at least in part to centrifugal force exerted by the wheels and having a magnitude which is directly proportional to the combined weight of the wheel structure and wheel cover. Obviously, by reason of a reduction in the weight of the wheel cover the combined weight of the wheel structure and cover is also reduced to result in a reduction in the aforementioned end thrust exerted by the wheels.

In the case of a wheel cover constructed largely from a plastic material in the manner hereinbefore described, the opportunity for unwanted metal to metal contact between parts of the wheel cover including the locking devices and between the cover and the wheel structure to which the cover is attached is reduced to a minimum. Applicant's cover therefore constitutes a distinct advantage in that there is little likelihood of noise occurring due to contact between these parts and this is especially important during braking when the greatest likelihood exists of relative motion occurring between these parts.

It should be understood that this invention is not limited to specific details of construction and arrangement thereof herein illustrated, and that changes and modifications may occur to one skilled in the art without departing from the spirit of the invention.

What is claimed is:

1. A hub cap for a wheel structure which includes a rim and body part with a plurality of spaced apertures therebetween, said hub cap comprising a disc portion having a plurality of openings therein disposed for alignment with the openings in the wheel structure, a plurality of holding devices each including a head end portion and a main body portion, means fastening the holding devices to the disc with the head end portion in firm contact with the outer surface of the disc and the main body portion extending through the openings in the disc such that said main body portions may be inserted in the openings in the wheel structure, the holding devices being turnable to locking positions wherein the holding devices latch onto the wheel structure for securing the hub cap in fixed spatial relation thereto, the holding devices each including an abutting surface which engages the wheel rim with the hub cap in its secured position so as to restrict movement thereof toward the wheel structure.

2. A hub cap for a wheel structure which includes a rim and body part with a plurality of spaced apertures therebetween, said hub cap comprising a disc portion having a plurality of openings therein disposed for alignment with the openings in the wheel structure, a plurality of holding devices each including a head end portion and a main body portion, means fastening the holding devices to the disc with the head end portion in firm contact with the outer surface of the disc and the main body portion extending through the openings in the disc such that said main body portions may be inserted in the openings in the wheel structure, the holding devices being turnable to locking positions wherein the locking devices latch onto the wheel structure for securing the hub cap in fixed spatial relation thereto, the body portions of said holding devices having a shoulder formed thereon disposed to engage the wheel rim with the holding devices in locking positions securing the hub cap to the wheel structure to thereby restrict movement of the hub cap toward the wheel structure.

3. A hub cap for a wheel structure which includes a rim and body part with a plurality of spaced apertures disposed therebetween; said hub cap comprising a disc portion with a plurality of openings therein disposed for alignment with the openings in the wheel structure; and a plurality of holding devices each including a head end portion and a main body portion; said holding devices being fastened to the disc and constituting a structural part of the hubcap assembly with the head end portions on the outer side of the disc and the main body portions extending through the openings in the disc permitting insertion of the main body portions in the openings in the wheel structure; said holding devices each having one abutting surface which in a secured position of the hub cap on the wheel structure bears against the wheel structure and holds the hub cap thereto, and another abutting surface which in the secured position of the hub cap on the wheel structure engages the rim to restrict flexure of the hub cap toward the wheel structure.

4. A hubcap according to claim 3 in which the main body portion of each holding device is in the form of a resilient strip elastically deformable for engagement of its abutting surfaces with the cooperating configurations of the wheel and rim and for disengagement of said surfaces from said configurations.

5. A hubcap according to claim 3 in which each holding device is made up of a plurality of assemblable and disassemblable parts for attachment and detachment, respectively, of the holding device to the disc.

References Cited in the file of this patent

UNITED STATES PATENTS

| | | |
|---|---|---|
| 2,106,586 | Zerk | Jan. 25, 1938 |
| 2,148,160 | Hollerith | Feb. 21, 1939 |
| 2,386,244 | Lyon | Oct. 9, 1945 |
| 2,595,873 | Mulhern | May 6, 1952 |
| 2,614,001 | Rycroft | Oct. 14, 1952 |
| 2,631,896 | Lyon | Mar. 17, 1953 |

FOREIGN PATENTS

| | | |
|---|---|---|
| 728,368 | France | Apr. 11, 1932 |
| 421,716 | Great Britain | Dec. 19, 1934 |
| 651,049 | Great Britain | Mar. 7, 1951 |
| 680,120 | Great Britain | Oct. 1, 1952 |